United States Patent [19]

Eagen

[11] Patent Number: 4,487,393
[45] Date of Patent: Dec. 11, 1984

[54] GATE VALVE HAVING A PRESSURE-SECURED SEAT

[75] Inventor: Duane M. Eagen, Marblehead, Mass.

[73] Assignee: Barton Valve Company, Inc., Shawnee, Okla.

[21] Appl. No.: 387,007

[22] Filed: Jun. 10, 1982

[51] Int. Cl.³ .............................................. F16K 3/00
[52] U.S. Cl. .................................. 251/328; 251/327; 251/195; 251/167
[58] Field of Search ............... 251/328, 197, 196, 167, 251/327, 195

[56] References Cited

U.S. PATENT DOCUMENTS

| | | | |
|---|---|---|---|
| 293,329 | 2/1884 | Jenkins | 251/328 |
| 2,834,571 | 5/1958 | Hollander | 251/328 X |
| 3,006,601 | 10/1961 | Anderson | 251/328 X |
| 3,689,028 | 8/1972 | Dickenson | 251/328 |
| 3,765,440 | 10/1973 | Grove | 251/328 X |

Primary Examiner—Harold W. Weakley
Attorney, Agent, or Firm—William R. Laney

[57] ABSTRACT

An expanding gate valve having a pressure-secured seat. The valve includes a valve body having a cavity formed therein and an inlet and outlet formed in the body, both of which intersect the cavity. A counterbore is formed about the circumference of both the inlet and the outlet at their respective intersections with the cavity. An annular seat having a rear surface and a front seat surface is received within the inlet counterbore. An annular seal is formed on the front seat surface and a second annular seal is disposed between the rear surface and the valve body. The front annular seal has a sealing diameter greater than the rear annular seal and an annular recess is formed on the front seat surface on the radially inward side of the annular seal. A second annular seat having a planar front seat surface is received within the outlet counterbore. An expandable gate is mounted for selective vertical positioning in the cavity for permitting flow between the inlet and outlet in one position and for sealing off such flow in another position. When in position for sealing off such flow, the gate is expanded into sealing engagement with the first and second seats.

2 Claims, 3 Drawing Figures

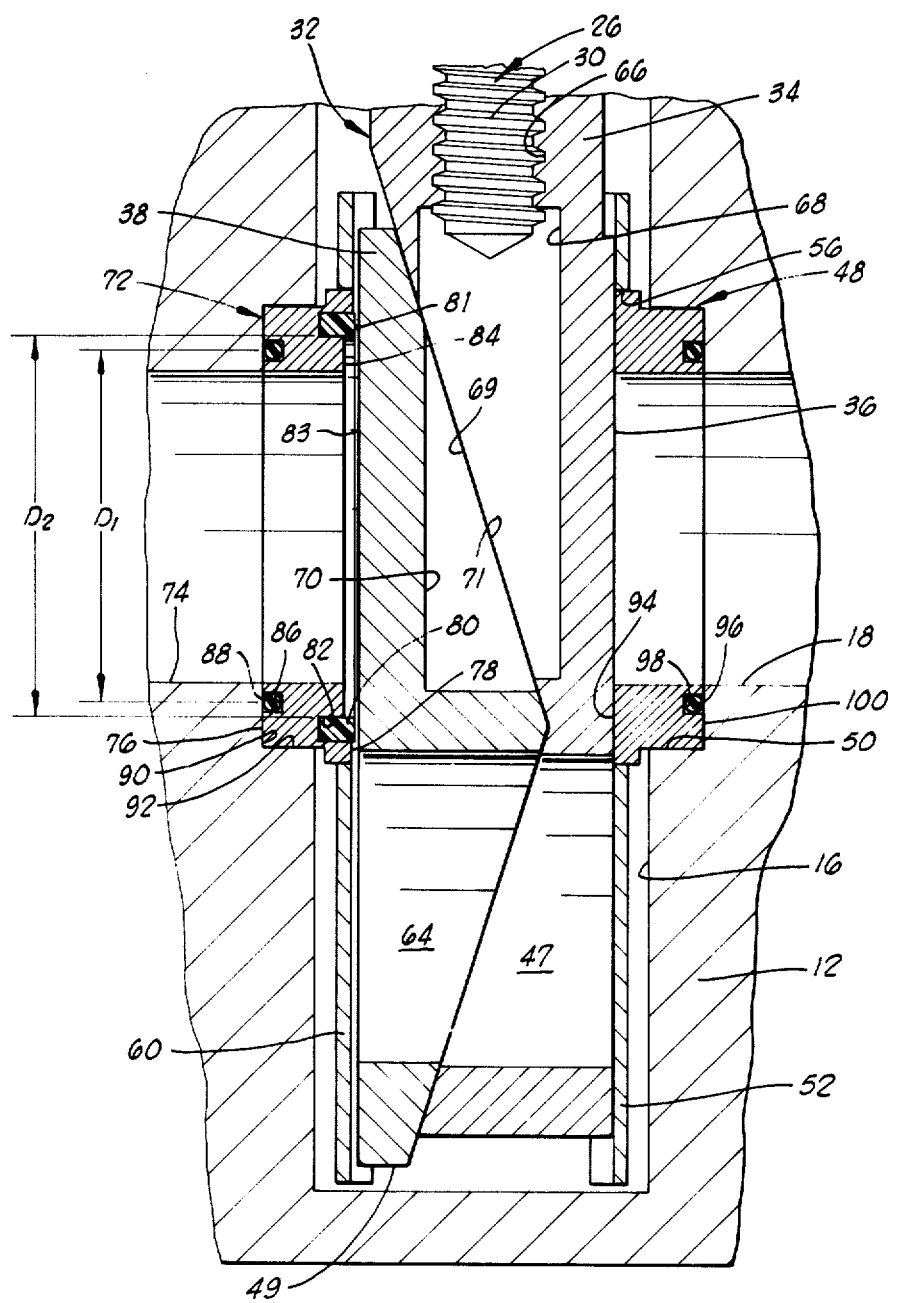
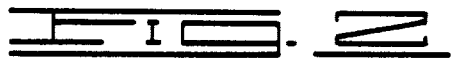

GATE VALVE HAVING A PRESSURE-SECURED SEAT

BACKGROUND AND SUMMARY OF THE INVENTION

The instant invention relates to gate valves and more particularly to such valves which include annular seats.

A conventional gate valve includes a valve body having a cavity formed therein. An inlet formed in the valve body provides fluid communication between the cavity and the exterior of the body. An outlet, typically being in axial alignment with the inlet, is formed in the body and provides fluid communication between the cavity and the exterior of the valve body. A gate, such usually being formed from one or more pieces of metal, is mounted on the valve body for lowering into the cavity for selectively shutting off fluid flow between the inlet and the outlet.

An annular metal seat ring is typically mounted on the valve body about the circumference of both the inlet and the outlet at their respective intersections with the cavity. A counterbore is provided about the circumference of the inlet and the outlet into which the seats are pressed. Each seat presents a surface toward the cavity against which the metal gate abuts in order to form a seal. The interior diameter of the seat is generally equal to the diameters of both the inlet and the outlet. An annular seal is mounted on the front surface of each seat for engaging the surface of the gate when the gate is positioned for sealing against the seats. The gate may be of the so-called expanding gate type in which the gate is formed of two or more metal pieces and includes side surfaces which are presented toward each of the annular seats. The gate also includes an opening so that when the gate is properly positioned, the opening registers with the annular seats to permit fluid flow between the inlet and the outlet. When the opening is moved downwardly out of registration with the annular seats, the gate expands to effect sealing between the gate sides and the seals on the annular seats thus shutting off the flow between the inlet and the outlet.

Such past gate valves have proved deficient in several respects. When such a valve is used to control the flow of fluids under high pressure, e.g., greater than 5,000 pounds per square inch, the seat mounted about the circumference of the inlet tends to move outwardly or blow out of the counterbore in which it is mounted when the gate is in position for shutting off fluid flow. Since it is difficult to obtain a metal-to-metal seal between the rear of the inlet seat and the bottom of the counterbore into which it is mounted, pressurized fluid may enter the space between the seat and the bottom of the counterbore thus tending to push the seat outwardly into the side of the gate. When such occurs, tremendous amounts of wear on both the seat and its annular seal occur when the valve gate is moved vertically.

When the gate is positioned for shutting off flow, high pressure fluid is pressing the gate against the outlet seat thus causing wear of the outlet seat, its annular seal, as well as the side of the gate sealed against the outlet seat.

When the seats are pressed tightly against the gate sides as described above, the seals tend to tear away or blow out from the seat surfaces when the gate is moved from a position shutting off flow to a position permitting flow. When the opening in the gate first passes across one side of the seal on, e.g., the outlet seat, fluid pressure in the opening is applied to the radially outer edge of the annular seal, whereas the radially inner edge of the annular seal is at the pressure of the outlet which is usually zero pounds per square inch. This pressure differential applied across one segment of the seal tends to force it up from the seat surface on which it is mounted, thus destroying the ability of the valve to seal off the inlet from the outlet.

In an effort to prevent the inlet seat from being blown out of the counterbore in which it is mounted, some designs have used an interference fit between the seat and its counterbore. Such construction requires a press capable of delivering many tons of force for securedly fitting the seat into the counterbore. While this may prevent blowing out of the inlet seat, it also prevents replacement of the seat unless such a press is available for applying the necessary force. In other words, if the valve is installed at a remote location, it must be removed and shipped to a point at which such a press is available for replacement of the seat.

In the case where a valve is required for use with high fluid pressures, some designs have utilized seats for both the inlet and the outlet which do not include seals. These seats are designed for providing a metal-to-metal seal against the gate on both the inlet and outlet sides. Such an arrangement is usable under high pressures; however, since high fluid pressure is required to urge the gate against the outlet seat to effect sealing, such seat designs are unworkable at lower pressures, e.g., 70 pounds per square inch. Accordingly, it may be necessary to utilize a valve of the type having annular seals mounted on the inlet and outlet seats in a low pressure situation and to use a valve of the type for effecting metal-to-metal seals in a high pressure situation. This may necessitate switching valves in an existing installation to facilitate handling of different fluid pressures.

It is a general object of the instant invention to provide a gate valve which overcomes the above-enumerated disadvantages inherent in prior art gate valves.

It is a more specific object of the invention to provide such a valve having seats which may be replaced without the use of many tons of force.

It is another specific object of the invention to provide a gate valve in which the incidence of seal blow-outs is greatly reduced.

It is yet another specific object of the invention to provide a gate valve in which the wear on the seats, seals and gates is greatly reduced.

It is yet a further specific object of the invention to provide such a gate valve which may be used to seal its inlet from its outlet in the presence of fluids varying from low to high pressure.

The instant invention includes a valve body having a cavity formed therein with an opposing inlet and outlet in axial alignment, each providing communication between the cavity and the exterior of the valve body. An annular seat is received within a counterbore formed about the circumference of the inlet at its intersection with the cavity. The seat includes a rear surface, such being in sealing engagement with the valve body, and a front seat surface, such having an annular seal mounted thereon. A recess is formed on the seat surface radially inwardly from the annular seal and is in fluid communication with the inlet. An expandable gate is mounted for selected vertical positioning in the cavity for permitting fluid flow in one vertical position and for shutting off such flow by sealing against the seat surface in another vertical position.

These and other objects and advantages of the instant invention will become more fully apparent as the following detailed description is read in view of the accompanying drawings.

BRIEF DESCRIPTION OF THE DRAWINGS

FIG. 2 is a cross-sectional view of a portion of the gate valve of FIG. 1 showing the gate in its non-expanded condition.

DETAILED DESCRIPTION OF THE INVENTION

Figure 1:
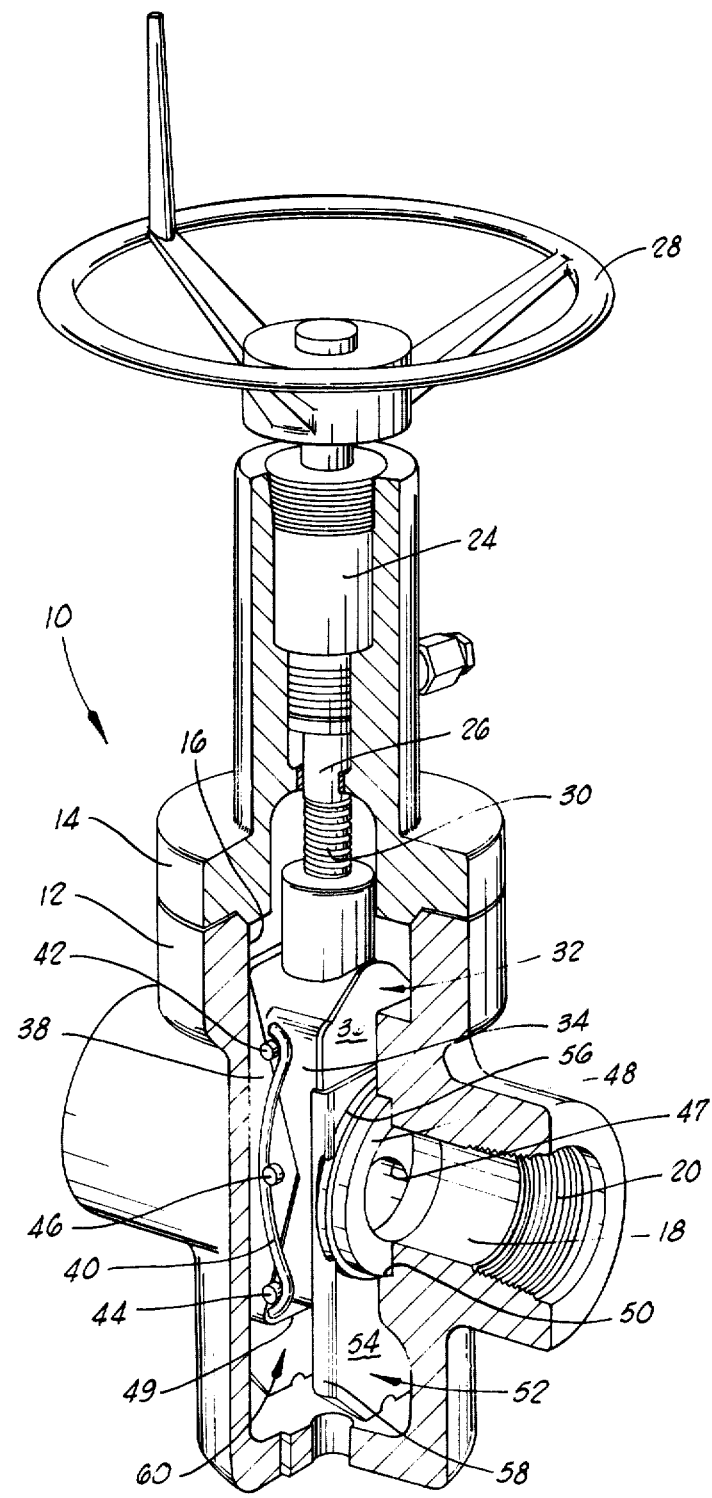
FIG. 1 is a perspective view, shown partly in quarter-section, of a gate valve constructed in accordance with the present invention.

Turning now to the drawings, and particularly to FIG. 1, indicated generally at 10 is a gate valve constructed in accordance with the present invention. The gate valve includes a valve body 12 and an upper valve body or bonnet 14. The valve body includes a cavity 16, such having an inlet (not visible in FIG. 1) and an outlet 18. Outlet 18 is cylindrically shaped and includes threads 20 for connection to pipe (not shown). The inlet, like outlet 18, is formed in valve body 12 and is in axial alignment with outlet 18 on the opposite side of the valve body from the outlet. The inlet also includes threads, like threads 20, for connecting the valve to pipe.

Bonnet 14 is secured to the top of valve body 12 via studs and nuts (not shown). A bearing housing 24 is received within and supported by bonnet 14 as shown. The bearing housing provides support for rotatably mounting a stem 26. Stem 26 extends upwardly to just above bearing housing 24. A hand wheel 28 is mounted on the top of stem 26 for rotating the stem.

The stem includes helical threads 30 which are threadably engaged in a threaded bore (not visible in FIG. 1) at the top of a gate 32. Gate 32 includes a first portion 34 having a surface 36 which is substantially normal to the longitudinal axis of inlet 18. Gate 32 includes a second portion 38 (partly visible in FIG. 1) which includes an outward facing surface (not visible) opposite surface 36 which faces the inlet and is substantially normal thereto. Gate portions 34, 38, are biased toward each other by a pair of springs, one of which is spring 40, mounted on opposite sides of the gate. Studs 42, 44 are fixedly mounted on and extend from gate portion 34; stud 46 is fixedly mounted on and extends from gate portion 38. The ends of spring 40 are restrained from movement by studs 42, 44 while the middle of spring 40 biases stud 46 and hence the second gate portion toward the first gate portion. Similar studs and a spring (not visible) are in the same configuration on gate 32 on the side of the gate opposite the just-described studs and spring. A flat lower end portion 49 extends across the bottom of gate portion 38.

A circular opening 47 is formed in first gate portion 34 and aligns with a circular opening (not shown) in the second gate portion. The circular openings are of substantially the same diameter as both the outlet and inlet 18 and, when gate 32 is vertically positioned so that opening 47 registers with the inlet (and therefore also registers with the outlet) fluid may flow freely from the inlet through the openings in the gate to the outlet.

An annular metal seat ring or seat 48 is received within a counterbore 50 formed in valve body 12. A second annular seat ring (not visible in FIG. 1) is received within a second counterbore (also not visible) on the opposite side of the gate from seat 48.

A gate guide 52 includes a substantially planar portion 54 which abuts against surface 36 of the gate. Portion 54 includes a circular opening 56 which is just large enough to fit over the outside diameter of seat 48. A pair of outward extending edges, one of which is edge 58, are formed along either side of portion 54. Another edge (not visible) is formed on the other side of portion 54 to provide, in cooperation with edge 58, a channel along which gate portion 34 may move vertically. A second gate guide 60 (only partly visible in FIG. 1) is substantially identical to gate guide 52 and fits over the annular seat (not visible in FIG. 1) opposite seat 48 to provide a channel for vertical movement of second gate portion 38.

For a view of certain structure which is either not visible or partly obscured in FIG. 1, attention is directed to FIG. 2. Opening 47 in gate portion 34 aligns with a corresponding opening 64 in gate portion 38. As will be recalled, stem 26 is threadably engaged via threads 30 in a threaded bore 66 on the top of gate portion 34. The lower end of the bore communicates with a cavity 68 formed on an angled surface 69 of gate portion 34 which in turn communicates with a corresponding cavity 70 formed on an angled surface 71 of gate portion 38. When surfaces 69, 71 abut each other as shown in FIG. 2, neither of cavities 68, 70 communicate with the exterior of the gate.

As has been previously mentioned, an annular seat ring or seat 72, such being also referred to herein as an upstream seat, is positioned about the circumference of an inlet 74. The seat includes a rear surface 76 and a front seat surface 78. An annular seal 80 is received within an annular groove 82 formed in front seat surface 78. An annular seal surface 81 is presented by annular seal 80 toward a surface 83 of gate portion 38. Surface 83 is substantially normal to the axis of inlet 74 and substantially parallel to both front seat surface 78 and to seal surface 81.

An annular recess 84 is formed about the radially inner circumference of seat 72 adjacent annular seal 80. Recess 84 communicates with the interior of seat 72 about the circumference of the recess. Rear surface 76 includes an annular channel 86 into which is received an annular O-ring 88. O-ring 88 is referred to herein as an annular seal and provides sealing engagement between rear surface 76 of seat 72 and an end 90 of a recess or counterbore 92 formed in valve body 12. Counterbore 92 has a diameter which permits seat 72 to be tightly received within the counterbore thus maintaining the seat in the position as shown.

Seat 48, also referred to herein as a seat ring or downstream seat, includes a planar front seat surface 94. An annular O-ring 96 is received within a channel 98 formed in a rear surface 100 of seat 48. Like seat 72, seat 48 is tightly received within its associated counterbore 50 in order to maintain it in position as shown.

In operation, the valve is changed from a condition in which inlet 74 is sealed from outlet 18 to a condition in which fluid freely flows from inlet 74 to outlet 18 by rotation of handwheel 28. Typically, valve 10 is connected to a source of high pressure fluid via inlet 74. When it is desired to let the high pressure fluid flow through the valve from inlet 74 to outlet 18, handwheel 28 is rotated to effect vertical movement of gate 32. Since gate 32 is threadably engaged with stem 26 via helically threaded bore 66, rotation of the stem forces the gate either upwardly or downwardly dependent upon the direction of stem rotation. For opening the valve to permit fluid flow therethrough, the stem is rotated until opening 64 is aligned with inlet 74, at which point opening 47 is in alignment with outlet 18 thus permitting flow through the valve.

Thereafter, if it is desired to close the valve, i.e., shut off fluid flow between inlet 74 and outlet 18, handwheel 28 is rotated in the opposite direction thus forcing gate 32 downwardly so that openings 64, 47 are moved beneath inlet 74 and outlet 18, respectively, as shown in FIG. 2. Further downward movement of gate 32 forces lower end 49 of second gate portion 38 into valve body 12. Additional rotation of stem 26 thus forces gate portion 34 slightly more downwardly and forces gate portions 38, 34 toward inlet 74 and outlet 18, respectively, due to the lateral force generated by the sliding of surfaces 69, 71 when gate portion 34 is forced downwardly. Thus, in the closed condition of the valve, the components thereof assume the configuration of FIG. 3.

The pressurized fluid contained in inlet 74 is prevented from entering cavity 16 due to the sealing action of annular seal 80 against surface 83 of gate portion 38 as well as the metal-to-metal seal generated by the annular portion of front seat surface 78 adjacent the seal on its radially outer side. Recess 84 permits pressurized fluid from inlet 74 to flow between front surface 78 of the seat and surface 83 of gate portion 38. Since O-ring 88 forms a circular seal having a smaller diameter (indicated in FIGS. 1 and 2 by alphanumeric designation $D_1$) than the circular seal formed by annular seal 80 (indicated in FIGS. 1 and 2 by alphanumeric designation $D_2$), the pressurized fluid received in recess 84 forces seat 72 against end 90 of counterbore 92.

Figure 3:
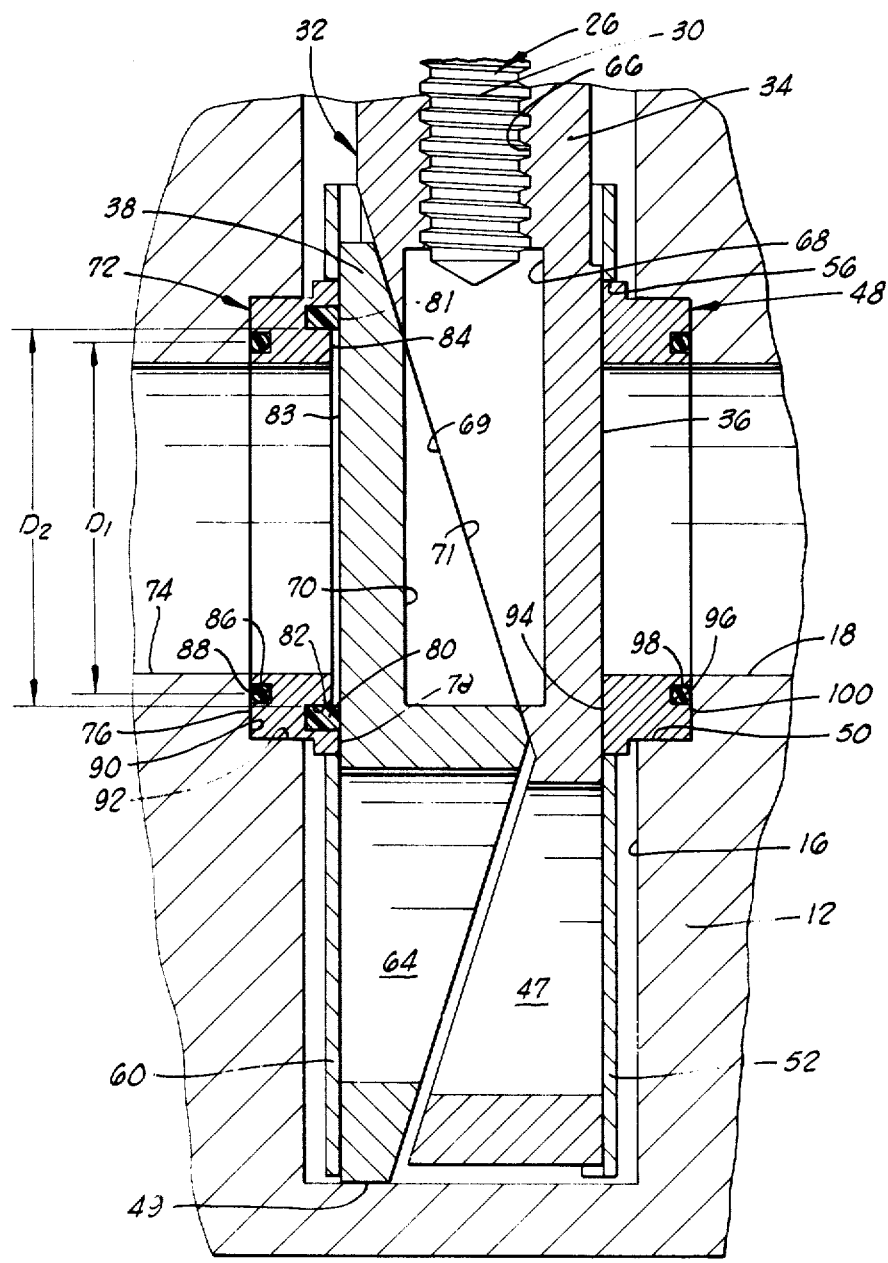
FIG. 3 is the same view as FIG. 2 but with the gate in its expanded condition.

The above-described sealed valve condition illustrated in FIG. 3 is effective to seal the inlet from the outlet when gases of a very high pressure, e.g., greater than 5,000 psi or of a very low pressure, e.g., 70 psi (as well as pressures therebetween), are contained in inlet 74. When high pressure gases are contained therein, the force of the gas tends to urge gate 32 against seat 48. An effective metal-to-metal seal is formed between surface 36 of gate portion 34 and front surface 94 of seat 48. Such a seal is generally effective only when high pressures are received within the inlet since a great deal of force is required to effectively generate a non-elastic metal-to-metal seal.

When low pressure gas is present in inlet 74, insufficient pressure exists to form a metal-to-metal seal between surfaces 36, 94. However, an effective low pressure seal is formed between surface 81 of annular seal 80 and between surface 83 of gate portion 38. Thus, the valve structure disclosed herein may be effectively used over a wide range of inlet fluid pressures including both low and high pressures.

It should be noted that the radially outer surface of seat surface 78 provides a seal surface against surface 83. Thus, seat 72 will seal the inlet from cavity 16 when the seat is constructed without an annular seal like seal 80.

When it is desired to move the gate from the sealed position in FIG. 3 to the unsealed position in FIG. 2, stem 26 is rotated to lift end 49 of gate portion 38 from valve body 12. When such is lifted the springs, one of which is spring 40, which bias gate portions 38, 34 against each other urge the gate portions to the position of FIG. 2 thus breaking the seal between seat 72 and surface 83. Annular seal 80 is formed of a conventional sealing material which has a lower elasticity than the material from which O-ring 88 is formed. Thus, the seal formed between surface 81 of annular seal 80 and surface 83 of gate portion 38 breaks prior to the seal formed between rear surface 76 of seat 72 and end 90 of counterbore 92. If the seal formed by O-ring 88 were the first to break, pressurized inlet fluid could enter the space between end 90 and rear surface 76 thus forcing seat 72 outwardly against surface 83 of gate portion 38. This condition may cause blowing out of annular seal 80 as well as increased wear on seal 80, seat 72 and gate portion 38. Since O-ring 88 is more elastic and hence more easily deformable than seal 80, it maintains its sealed condition at least until the seal formed by seal 80 is broken.

It is to be appreciated that modifications and additions to the structure disclosed herein may be made without departing from the spirit of the invention which is defined in the following claims.

What is claimed is:

1. A gate valve comprising:
   a valve body having a cavity formed therein;
   an inlet providing communication between said cavity and the exterior of said body;
   an outlet aligned with the inlet and providing communication between said cavity and the exterior of said body;
   an axially expandable gate mounted for selected vertical positioning in said cavity, said gate including an opening for permitting flow between said inlet and outlet in one gate position;
   a counterbore formed about the circumference of said inlet at its intersection with said cavity;
   an annular seat having a rear surface and a front surface, said seat being received within said counterbore so that said rear surface is engaged with said valve body and said front surface is presented toward said cavity;
   an annular seal surface on said front surface of said seat, having a sealing diameter;
   a recess formed in said front surface of said seat radially inwardly from said annular seal surface, said recess having an outside diameter and being in fluid communication with said inlet regardless of valve gate position;
   expansion means for moving said gate against said front surface of said seat in another gate position for sealing between said gate and said front surface;
   an annular seal having a greater elasticity than said annular seal surface disposed between said rear surface of said seat and said valve body, said annular seal having a sealing diameter smaller than said sealing diameter of said annular seal surface and smaller than said outside diameter of said recess;
   a second counterbore formed about the circumference of said outlet at its intersection with said cavity;
   a second annular seat having a rear surface and a front surface, said second seat being received within said second counterbore so that said front surface of said second seat is presented toward said cavity; and
   a second annular seal surface on said front surface of said second seat for sealing between said second seat and said gate and responsive to inlet pressurization.

2. The valve of claim 1 wherein at least a portion of said first-mentioned annular seal surface is elastomeric.

* * * * *